US009725668B2

(12) United States Patent
O'Brien et al.

(10) Patent No.: US 9,725,668 B2
(45) Date of Patent: Aug. 8, 2017

(54) PROCESS FOR CLARIFYING BIOFUELS

(71) Applicant: BAKER HUGHES INCORPORATED, Houston, TX (US)

(72) Inventors: Timothy J. O'Brien, Sugar Land, TX (US); Waynn C. Morgan, Alvin, TX (US); John A. Schield, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/835,162

(22) Filed: Aug. 25, 2015

(65) Prior Publication Data

US 2015/0361373 A1    Dec. 17, 2015

Related U.S. Application Data

(62) Division of application No. 12/134,942, filed on Jun. 6, 2008, now Pat. No. 9,127,226.

(51) Int. Cl.

| C10L 10/18 | (2006.01) |
|---|---|
| C08F 222/06 | (2006.01) |
| C10L 1/18 | (2006.01) |
| C10L 1/14 | (2006.01) |
| C10L 1/16 | (2006.01) |
| C10L 1/197 | (2006.01) |
| C10L 1/236 | (2006.01) |

(52) U.S. Cl.
CPC ............ *C10L 10/18* (2013.01); *C08F 222/06* (2013.01); *C10L 1/143* (2013.01); *C10L 1/16* (2013.01); *C10L 1/18* (2013.01); *C10L 1/1976* (2013.01); *C10L 1/2364* (2013.01); *C10L 2200/0476* (2013.01); *C10L 2250/04* (2013.01); *C10L 2270/026* (2013.01)

(58) Field of Classification Search
USPC ............................................ 44/331; 526/272
See application file for complete search history.

(56) References Cited

U.S. PATENT DOCUMENTS

| 6,080,211 | A | 6/2000 | Mathur |
|---|---|---|---|
| 6,371,998 | B1 | 4/2002 | Mathur |
| 9,127,226 | B2 | 9/2015 | O'Brien et al. |
| 2003/0101641 | A1 | 6/2003 | Mathur |
| 2003/0163952 | A1 | 9/2003 | Rae |
| 2004/0244278 | A1 | 12/2004 | Siggelkow et al. |
| 2005/0108924 | A1 | 5/2005 | Krull |
| 2005/0113266 | A1 | 5/2005 | Krull et al. |
| 2005/0155282 | A1 | 7/2005 | Siggelkow et al. |
| 2005/0257421 | A1 | 11/2005 | Siggelkow et al. |

(Continued)

OTHER PUBLICATIONS

IFQC, Special Report: US—Summary of the Biofuels Policy & Technology Briefing in Washington, DC, Oct. 20, 2005, pp. 1-12.

(Continued)

*Primary Examiner* — Ellen McAvoy
*Assistant Examiner* — Chantel Graham
(74) *Attorney, Agent, or Firm* — Mossman, Kumar & Tyler, P.C.

(57) ABSTRACT

Haze may be removed from a biofuel or biofuel intermediate by using a clarifier. The clarifier includes copolymer prepared using a formulation comprising an alpha olefin and maleic anhydride. The clarifier may also be used with admixtures of biofuels, biofuel intermediates, or biofuel feedstocks with conventional hydrocarbons.

20 Claims, 1 Drawing Sheet

(56) References Cited

U.S. PATENT DOCUMENTS

2007/0039239 A1     2/2007   Forester et al.
2009/0031614 A1     2/2009   MacPherson et al.

OTHER PUBLICATIONS

U.S. Department of Energy, Biomass, 2004 Biodiesel Handling and Use Guidelines, pp. 1-68.

Tammy Klein, IFQC, A Review of Fuel Quality Programs and Policies in North America, Aug. 22, 2007, pp. 1-36.

ASTM Designation D 4176-93 (Reapproved 1997), Standard Test Method for Free Water and Particulate Contamination in Distillate Fuels (Visual Inspection Procedures), pp. 746-748.

Hart Energy, U.S. Government Affairs Services, "State Biodiesel Initiatives, Current Status and Future Prospects" 6 pp., (date unknown).

PROCESS FOR CLARIFYING BIOFUELS

CROSS-REFERENCE TO RELATED APPLICATION

This application is a divisional application of U.S. Ser. No. 12/134,942 filed Jun. 6, 2008, issued as U.S. Pat. No. 9,127,226 on Sep. 8, 2015.

BACKGROUND OF THE DISCLOSURE

1. Field of the Invention

The present invention relates to a method for clarifying biofuels. The present invention particularly relates to clarifying biodiesel.

2. Background of the Prior Art

It is well known that as the cost of crude oil increases, numerous efforts have been made to find and develop alternative fuels, particularly fuels that have a renewable, rather than a limited, source. Considerable effort has been expended researching potential fuels from regenerable biological sources, or biofuels. Biodiesel is a diesel fuel-equivalent, processed fuel derived from biological sources (such as vegetable oils), which may be used in unmodified diesel engine vehicles.

In the context herein, biodiesel fuels include, but are not necessarily limited to, alkyl esters of a fatty acid, typically either the ethyl ester or methyl ester of a fatty acid. Thus, many biodiesel fuels may be understood to contain fatty acid methyl esters (FAME). Most biodiesel fuel is presently made by transesterification of fatty triglycerides. Biodiesel fuel may also be made from free fatty acids using an acid catalyst. There are other processes that use an ion-exchange resin catalyst. Most biodiesel fuels are made from vegetable oils, including, but not necessarily limited to rapeseed, soybean, cotton seed, corn, jotropha and the like oils. Some biodiesel is made from animal fats, including, but not limited to beef and pig tallow, chicken fat, fry grease, restaurant trap grease, fish oil, and the like. Efforts are also being made to blend FAME compounds to modify properties such as low temperature handling, for instance esters from palm and soybean oils or soybean and tallow oils (e.g. beef). The mixtures may be complex. All of these fall within the definition of biodiesel fuel herein. Non-esterified or straight vegetable oils (SVO) or straight waste vegetable oil (WVO) is not included in the definition of biodiesel fuels herein. However, biodiesel fuels as defined herein may include these non-esterified SVOs or WVOs in minor proportions (less than 50 volume %, and in another embodiment less than about 1%).

The processing of biofuels is not without problems. For example, many biofuels are less hydrophobic than similar fuels prepared using fossil feedstocks. The presence of the resulting "extra" water can cause problems with processing biofuels and biofuel feedstocks. It may be desirable in the art of preparing biofuels to remove or lessen the concentration of contaminants, especially metals, in biofuels and biofuel feedstocks visible as haze.

SUMMARY OF THE INVENTION

In one aspect, the invention is a process for removing haze from a biofuel or biofuel intermediate, the process including admixing the biofuel or biofuel intermediate with a clarifier including a copolymer at a concentration sufficient to clarify the biofuel or biofuel intermediate. The copolymer is prepared using a formulation including an alpha olefin and maleic anhydride. In one embodiment, the clarifier is the product of reacting the copolymer with an amine or alcohol.

In another aspect, the invention is a clarifier including a copolymer prepared using a formulation including an alpha olefin and maleic anhydride. In one embodiment, the clarifier is the product of reacting the copolymer with an amine or alcohol.

In still another aspect, the invention is a biofuel prepared using a process for removing haze from a biofuel or biofuel intermediate, the process including admixing the biofuel or biofuel intermediate with a clarifier including a copolymer at a concentration sufficient to clarify the biofuel or biofuel intermediate. The copolymer is prepared using a formulation including an alpha olefin and maleic anhydride. In one embodiment, the clarifier is the product of reacting the copolymer with an amine or alcohol.

BRIEF DESCRIPTION OF THE FIGURES

The disclosure is best understood with reference to the accompanying figures, of which.

DETAILED DESCRIPTION OF THE INVENTION

Figure 1:
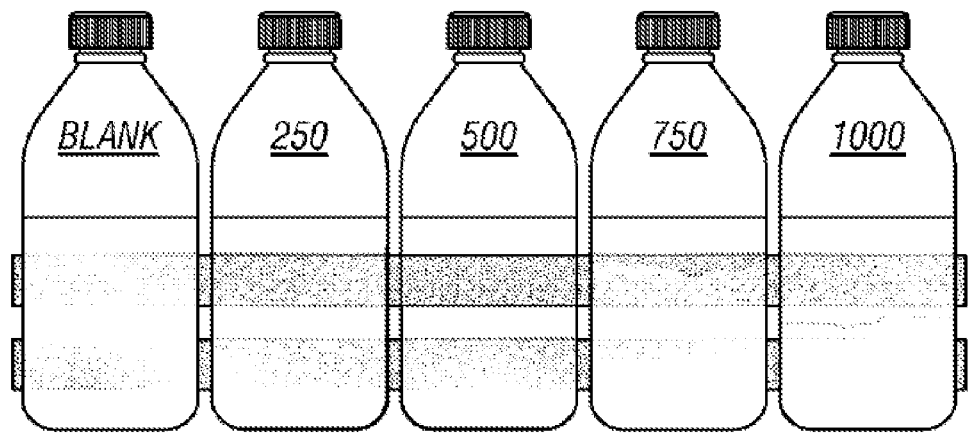
FIG. 1 is a photograph of the test specimens of Example 1.

In some embodiments of the invention, a biofuel or biofuel intermediate is admixed with a clarifier to remove haze. For the purposes of this application the term "haze" means anything present in a biofuel or biofuel intermediate, such as a biodiesel, that causes a cloudy or translucent appearance. For example, water alone may cause haze in some biofuels or biofuel intermediates. Another source of haze is liquids other than water that are insoluble in the continuous phase of the biofuel or biofuel intermediate. Either of these liquids, if dispersed or in the form of an emulsion, may produce haze. Still another source of haze is a dispersion of insoluble compounds such as inorganic salts and the like.

In one embodiment, the invention is a process for removing haze from a biofuel or biofuel intermediate including admixing the biofuel or biofuel intermediate with a clarifier comprising a copolymer of an alpha olefin and maleic anhydride. The copolymer may be prepared using an alpha olefin having from about 2 to about 60 carbons. In some embodiments, the alpha olefin useful for preparing the copolymer may have from about 6 to about 30 carbons. In still another embodiment, the alpha olefin may have from about 8 to about 24 carbons.

The copolymer may be made using a molar ratio of maleic anhydride to alpha olefin of from about 1:2 to 2:1. In some embodiments, the ratio is from about 3:2 to about 2:3. In other embodiments, the molar ratio is about 1:1.

In some embodiments, the copolymers may have a molecular weight ($M_n$) of from about 3,000 to about 100,000. In other embodiments, the copolymers may have a molecular weight ($M_n$) of from about 4,000 to about 50,000. In still other embodiments, the copolymers may have a molecular weight ($M_n$) of from about 5,000 to about 15,000.

In some embodiments, the copolymer may be prepared using minor amounts of other polymerizable materials. For example, a second alpha olefin may be used. In some embodiment, the minor amounts of other polymerizable materials may be from about 1 to about 5 percent, by weight, of the copolymer.

The copolymer may be prepared using any method known to be useful to those of ordinary skill in the art of preparing copolymers. For example, in one embodiment, the copolymers may be prepared using free radical polymerization. Free radical polymerization may be induced using a free radical polymerization catalyst such as a peroxide. In another embodiment, the copolymer may be prepared using other types polymerization catalysts such as Ziegler-Natta catalysts, Chromium Catalysts, and Metallocene Catalysts.

In one embodiment, the copolymers may be further reacted to form ester and/or amide derivatives. The alcohols and amines useful for preparing these esters or amides include those having from about 2 to about 30 carbons. In one embodiment, the alcohols and amines may have from about 6 to about 22 carbons. In another embodiment, the alcohols and amines may have from about 8 to about 22 carbons.

The amides and esters may be prepared by performing a condensation reaction between the anhydride moiety and the alcohol and/or amine. When an amine is used, each anhydride moiety produces two amide moieties. When an alcohol is used, each anhydride moiety produces two ester moieties. The alcohol or amine may be used alone or in combination to produce a copolymer derivative having both ester and amide moieties. Less than stoichiometric amounts of alcohols and/or amines may be used to produce derivatives having residual anhydride moieties. In some embodiments, the copolymer may have ester moieties, amide moieties, and anhydride moieties. In one embodiment, the copolymer has anhydride moieties and ester moieties present in a ratio of about 1:1.

The clarifier of the disclosure may be used in concentrations sufficient to reduce haze and/or contaminants to a predetermined level. For example, there may be a specification that may be met using the process of the disclosure, such as the 500 ppm water specification required for biodiesel in Europe. Another such specification may be a limitation on the amount of calcium that may be present. While those of ordinary skill in operating a refinery or blending fuels from different sources well know how to determine the optimal concentration to meet the specifications for the processes they are operating, generally speaking, the clarifiers may be used at a concentration of from about 3 to about 10,000 parts per million (ppm) weight per volume. In some embodiments, the concentration of the clarifiers used is from about 100 ppm to about 850 ppm. In other embodiments, the clarifiers are used at a concentration of about 500 ppm. In some embodiments of the invention, care should be taken to avoid over-treatment as that may cause a phase separation which may be undesirable in some applications.

The clarifiers of the disclosure may be employed to reduce haze in biofuels and biofuel intermediates, the intermediated including biofuel feedstocks. For the purposes of this disclosure, the term biofuels means fuels derived from renewable, non-fossil, feedstocks. The term fossil feedstock refers to crude oil and coal, and the like. For example, oil sand hydrocarbons are an example of a fossil feedstock. The term biofuel feedstocks means materials used to prepare biofuels including, but not limited to vegetable oils and animal fats. Specific biofuel feedstocks include, but are not limited to: palm, rapeseed, soybean, cotton seed, corn, and jotropha oils; and beef, sheep, and pig tallow, chicken fat, fry grease, restaurant trap grease, fish oil, and the like. Biodiesel means a biofuel having physical properties similar to diesel fuel, but derived, at least partially, from non fossil sources possibly including alkyl esters of a fatty acid, typically either the ethyl ester or methyl ester of a fatty glyceride. Conventional hydrocarbon means hydrocarbons prepare from fossil feedstocks.

Biofuels may be prepared using 100% biofuel feedstocks. For example, biodiesel fuel B100 has a particular definition, including, among other parameters, a minimum ester content of 96.5 wt %. It may be made by transesterifying triglycerides from palm oil, soybean oil, tallow, rapeseed oil and/or waste oils with methanol in the presence of a catalyst.

Biofuels are often available as a blend with fuels originating from fossil sources. Gasoline(s) incorporating various amounts of ethanol are now common, but it would be desirable in the art of refining fossil feedstocks to be able to incorporate heavier biofuel feedstocks into conventional fuel refining processes. One problem with doing so is the entrained water and water soluble and dispersible contaminants often found in biofuels biofuel feedstocks.

In one embodiment of the invention, a biofuel such as a biodiesel, is prepared but rather than being sold as a specialty fuel, it is incorporated into a feed stream within an oil refinery. Prior to being incorporated with the refinery process, the biodiesel is treated with a clarifier of the disclosure. In one embodiment of this process, the biodiesel is treated with clarifier and then sent through a centrifuge. In another embodiment, the biodiesel is treated with the clarifier and then sent through a cyclone separator. In yet another embodiment, the treated biodiesel is held undisturbed and water and condiments are allowed to settle by means of gravity prior to separation from the biodiesel. In one application where a clarifier is introduced into a tank truck or a tank car prior to shipment, the clarifier may act to cause entrained water and/or water soluble or dispersed contaminants to coalesce during shipment and then be caught in a filter as the fuel is decanted from the tank.

In another embodiment of the invention, a biofuel intermediate or a biofuel feedstock is first treated with a clarifier of the disclosure and the included within a refinery process. For example, a process stream resulting from a transesterification process is treated with a clarifier of the disclosure to remove water and water soluble or dispersible contaminants, and then finished prior to introducing the finished biofuel into an oil refinery process. In still another embodiment, the biofuel intermediate is treated and then introduced into a refinery process stream without finishing.

In yet another embodiment of the invention, a biofuel or biofuel intermediate is introduced into a refinery process stream resulting in a biofuel admixture. At some point prior to a process step that requires very low water or water soluble or dispersible contaminants, such as a catalyst bed or distillation column; the biofuel admixture is treated with a clarifier of the disclosure.

In still another embodiment of the invention, a biofuel is admixed with a finished hydrocarbon produced from a fossil feedstock such as crude oil. In such embodiments, the admixture of biofuel and fuel produced from fossil feedstocks may be treated with a clarifier of the invention to remove or lessen the concentration of water and/or water dissolved or dispersed contaminants.

In the practice of some embodiments of the invention, a clarifier is admixed with biofuels, biofuel feedstocks, biofuel intermediates, and admixtures of these with hydrocarbon process streams and finished hydrocarbons. The clarifier may be introduced into these admixtures in any way known to be useful to those of ordinary skill in the art. For example, in one embodiment, an admixture of biodiesel and conventional diesel is admixed with an emulsifier by adding the clarifier to the admixture prior to the admixture passing through a static mixer. In another embodiment, the clarifier is added to a vessel containing a biofuel that is then stirred using a mixer. In still another embodiment, the clarifier can be added to the input or exit line of a recirculating pump on a vessel holding a biofuel or biofuel feedstock. In yet another embodiment, the clarifier may be added to a truck transporting a biofuel or an admixture of hydrocarbons including a biofuel.

The clarifiers of the disclosure may be used to decrease water concentration in biofuels and biofuel intermediates and feedstocks, but they may also function to reduce or remove water soluble and water dispersible contaminants. Exemplary of such contaminates are: metal salts or oxides, process catalysts, and the like.

The clarifiers of the disclosure, in addition to the product of oxyalkylating a resin prepared from a formulation including a phenol and a compound selected from the group consisting of an aldehyde, a diamine a polyamine and mixtures thereof; may also include other materials. For example, the clarifiers may include stabilizers, solvents, and additives.

EXAMPLES

The following examples are provided to illustrate the present invention. The examples are not intended to limit the scope of the present invention and they should not be so interpreted. Amounts are in weight parts or weight percentages unless otherwise indicated.

Example 1

A sample of a biodiesel prepared from canola oil was used for the examples. The biodiesel was yellow and very hazy. The biodiesel was treated with varying concentrations of BIO 9975 from the Baker Petrolite Corporation as shown below in Table 1. This material is a copolymer of maleic anhydride, $C_{20-24}$ alpha olefin, and $C_{30}+$ alpha olefin prepared using a di-t-butyl peroxide catalyst and then esterified using 1-octadecanol and behenyl alcohols.

The samples were treated and left undisturbed for 24 hours. The samples were then evaluated by placing the sample in front of a white background including a black line. The evaluations are displayed below in Table 1 and a photograph of the samples is attached as FIG. 1.

Example 2

Figure 2:
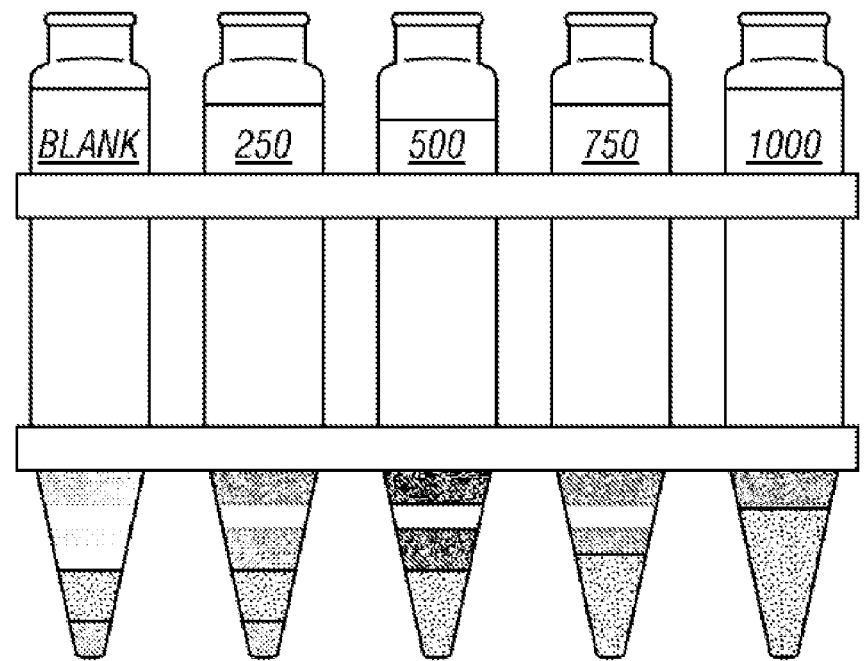
FIG. 2 is a photograph of the test specimens of Example 2.

The same samples as used in Example 1 were allowed to sit undisturbed in centrifuge tubes and then centrifuged at 600 rcf for 10 minutes (i.e., relative centrifugal force as per ASTM-4007). The centrifuge tubes were evaluated similar to Example 1 and the evaluations are displayed below in Table 1 and a photograph of the samples is attached as FIG. 2.

Example 3

100 mL aliquots of the biodiesel feedstock (e.g., chicken fat & canola oil) were prepared and dosed with BIO 9975 at 500 and 750 ppm treatment rates. After addition of the additive, each sample was shaken to ensure complete mixing. The samples were then centrifuged for 10 minutes @ 600 rcf without any delay and the results are summarized in Table 2 showing the ppm metals sodium (Na), Potassium (K), & Magnesium (Mg) that were left in the top phase of the centrifuge tube as well as the percent (%) of these same metals that that had been centrifuged or separated out to the bottom phase where they could be easily removed.

TABLE 1

| Dose, ppm | Appearance Before Centrifuge | Appearance After Centrifuge |
|---|---|---|
| — | Very hazy, no separation | Very hazy, some separation |
| 250 | Hazy, slight phase separation | Hazy, phase separation |
| 500 | Clear, phase separation | Clear, phase separation |
| 750 | Very slightly hazy, phase separation | Very slightly hazy, phase separation |
| 1000 | Slightly hazy, phase separation | Hazy, phase separation |

TABLE 2

| Feedstock | ppm BIO 9975 | ppm Na | ppm K | ppm Mg | % Na | % K | % Mg |
|---|---|---|---|---|---|---|---|
| Chicken Fat | 0 | 13 | 49 | 2.7 | — | — | — |
| " | 500 | 5 | 24 | 1.8 | 54 | 51 | 33 |
| Canola Oil | 0 | 11 | 12 | 1.1 | — | — | — |
| " | 500 | 5 | 1.1 | 0.5 | 55 | 91 | 55 |

What is claimed is:

1. A clarifier for use with biofuels and biofuel intermediates comprising a copolymer prepared using a formulation comprising an alpha olefin and maleic anhydride, wherein the clarifier is added to the biofuel or biofuel intermediate in a concentration sufficient to reduce haze in the biofuel or biofuel intermediate.

2. The clarifier of claim 1 where the copolymer is further reacted with an amine or an alcohol.

3. The clarifier of claim 1 where the alpha olefin has from about 2 to about 60 carbons.

4. The clarifier of claim 1 where the molar ratio of maleic anhydride to alpha olefin is from about 1:2 to 2:1.

5. The clarifier of claim 1 where the copolymer has a molecular weight ($M_n$) of from about 3,000 to about 100,000.

6. The clarifier of claim 1 where the formulation additionally comprises minor amounts of other polymerizable materials.

7. The clarifier of claim 1 where the copolymer is prepared using a free radical catalyst.

8. A biofuel comprising the clarifier of claim 1, wherein the clarifier is present in the biofuel in a concentration of from about 100 ppm to about 850 ppm.

9. The biofuel of claim 8 further comprising a conventional hydrocarbon.

10. The biofuel of claim 8 where the biofuel is a biodiesel.

11. The biofuel of claim 8 where the copolymer is further reacted with an amine or an alcohol.

12. The biofuel of claim 8 where the alpha olefin has from about 2 to about 60 carbons.

13. The biofuel of claim 8 where the copolymer has a molar ratio of maleic anhydride to alpha olefin is from about 1:2 to 2:1.

14. The biofuel of claim 8 where the copolymer has a molecular weight (Mn) of from about 3,000 to about 100,000.

15. The biofuel of claim 8 where the formulation additionally comprises minor amounts of other polymerizable materials.

16. A biofuel or biofuel intermediate comprising:
biodiesel; and
a clarifier comprising a copolymer prepared using a formulation comprising an alpha olefin having from about 2 to about 60 carbons and maleic anhydride, where the copolymer has a molar ratio of maleic anhydride to alpha olefin is from about 1:2 to 2:1, wherein the clarifier is present in the biodiesel in a concentration of from about 100 ppm to about 850 ppm.

17. The biofuel or biofuel intermediate claim 15 further comprising a conventional hydrocarbon.

18. The biofuel or biofuel intermediate claim 15 where the copolymer is further reacted with an amine or an alcohol.

19. The biofuel or biofuel intermediate of claim 15 where the copolymer has a molecular weight (Mn) of from about 3,000 to about 100,000.

20. The biofuel or biofuel intermediate of claim 15 where the formulation additionally comprises minor amounts of other polymerizable materials.

* * * * *